(12) United States Patent
Huff (10) Patent No.: US 7,283,481 B2
(45) Date of Patent: *Oct. 16, 2007

(54) AUTO DETECTION OF COPPER AND FIBER MODE

(75) Inventor: Gary S Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 10/230,160

(22) Filed: Aug. 29, 2002

(65) Prior Publication Data

US 2003/0179711 A1    Sep. 25, 2003

Related U.S. Application Data

(60) Provisional application No. 60/398,604, filed on Jul. 26, 2002, provisional application No. 60/365,806, filed on Mar. 21, 2002.

(51) Int. Cl.
   *H04J 1/16*    (2006.01)
   *H04J 3/14*    (2006.01)
   *H04L 1/00*    (2006.01)

(52) U.S. Cl. .................................... 370/248

(58) Field of Classification Search ............. 370/248, 370/282, 229, 463, 360, 213, 465, 445, 296, 370/501, 447, 419; 709/250, 203, 253; 375/239, 375/348, 346, 350, 229; 385/134, 139, 147; 455/296, 63.1

See application file for complete search history.

(56) References Cited

U.S. PATENT DOCUMENTS 4,862,452 A    8/1989    Milton et al.

(Continued)

FOREIGN PATENT DOCUMENTS

| EP | 0 573 204 A2 | 12/1993 |
|---|---|---|
| EP | 0 856 975 A2 | 8/1998 |
| EP | 0 856 975 A3 | 8/1998 |
| WO | WO 00/59176 | 10/2000 |
| WO | WO 01/47159 A1 | 6/2001 |
| WO | WO 03/081785 A1 | 10/2003 |

OTHER PUBLICATIONS

U.S. Appl. No. 10/230,158, filed Aug. 29, 2002, Huff.

(Continued)

*Primary Examiner*—Chi Pham
*Assistant Examiner*—Prenell Jones
(74) *Attorney, Agent, or Firm*—Sterne Kessler Goldstein & Fox, P.L.L.C.

(57) ABSTRACT

Methods and systems for operating a physical layer device ("PHY") in an Ethernet network include methods and systems for detecting active link partners and for selecting a mode of operation based on detected active link partners. The PHY monitors fiber link media and copper link media for active link partners. The PHY selects a mode of operation according to detected active link partners. For example, a copper mode of operation is selected, preferably through logic circuitry, when an active copper link partner is detected and an active fiber link partner is not detected. Similarly, a fiber mode of operation is selected, preferably through logic circuitry, when an active fiber link partner is detected and an active copper link partner is not detected. The PHY interfaces with the active copper link partner when the copper mode of operation is selected. Similarly, the PHY interfaces with the active fiber link partner when the fiber mode of operation is selected. The copper or fiber mode of operation can be prioritized for when active copper and fiber link partners are detected. The prioritized mode can be user selectable or factory set. The invention optionally powers down circuitry associated with an unselected mode of operation.

40 Claims, 7 Drawing Sheets

U.S. PATENT DOCUMENTS

| | | | |
|---|---|---|---|
| 5,095,308 | A | 3/1992 | Hewitt |
| 5,577,023 | A | 11/1996 | Marum et al. |
| 5,768,301 | A | 6/1998 | Dreyer et al. |
| 5,790,946 | A | 8/1998 | Rotzoll |
| 5,907,553 | A * | 5/1999 | Kelly et al. .................. 370/433 |
| 6,026,494 | A | 2/2000 | Foster |
| 6,065,073 | A | 5/2000 | Booth |
| 6,215,764 | B1 | 4/2001 | Wey et al. |
| 6,393,050 | B1 | 5/2002 | Liu |
| 6,418,558 | B1 * | 7/2002 | Roberts et al. ............. 725/129 |
| 6,442,142 | B1 | 8/2002 | Bar-Niv |
| 6,459,393 | B1 | 10/2002 | Nordman |
| 6,487,214 | B1 | 11/2002 | Bachar |
| 6,678,728 | B1 | 1/2004 | Uppunda et al. |
| 6,691,233 | B1 | 2/2004 | Gannage et al. |
| 6,697,368 | B2 | 2/2004 | Chang et al. |
| 6,819,760 | B1 | 11/2004 | Nayler |
| 6,894,602 | B2 | 5/2005 | Browning |
| 7,020,728 | B1 | 3/2006 | Jones et al. |
| 7,024,489 | B2 | 4/2006 | Aviles |
| 7,027,459 | B2 | 4/2006 | Fukui et al. |
| 7,054,309 | B1 * | 5/2006 | Hoot et al. .................. 370/360 |
| 7,119,701 | B2 | 10/2006 | Browning |
| 7,127,624 | B2 | 10/2006 | Berman et al. |
| 7,149,397 | B2 | 12/2006 | Popovic et al. |
| 2002/0019954 | A1 | 2/2002 | Tran |
| 2002/0023234 | A1 | 2/2002 | Berman et al. |
| 2003/0179709 | A1 | 9/2003 | Huff |
| 2003/0179710 | A1 | 9/2003 | Huff |
| 2003/0179771 | A1 | 9/2003 | Chan et al. |
| 2003/0179816 | A1 | 9/2003 | Huff et al. |
| 2003/0223469 | A1 | 12/2003 | Deng |
| 2004/0017815 | A1 | 1/2004 | Huff |
| 2005/0111531 | A1 * | 5/2005 | Booth et al. ................. 375/219 |
| 2005/0196119 | A1 * | 9/2005 | Popovic et al. ............. 385/134 |
| 2007/0022310 | A1 | 1/2007 | Berman et al. |

OTHER PUBLICATIONS

U.S. Appl. No. 10/230,159, filed Aug. 29, 2002, Huff.
U.S. Appl. No. 10/231,066, filed Aug. 30, 2002, Huff et al.
U. S. Appl. No. 10/347,295, filed Jan. 21, 2003, Huff.
Final/Partial European Search Report for Appln. No. EP 03 00 6504, mailed Sep. 29, 2003, 2 pages.
Search Report for European App. No. EP 03006503, dated Sep. 29, 2003, 3 pgs.
Search Report for PCT Application No. PCT/US03/08684, filed Mar. 21, 2003, 7 pgs.
10 Gigabit Ethernet Technology Overview White Paper, Revision 1.0, 10GEA: 10 Gigabit Ethernet Alliance, pp. 1-21 (May 2001).
Design Considerations for Next Generation LAN and SAN Gigabit Ethernet Switches, Cicada Semiconductor and SwitchCore Corp., pp. 1-13 (Jun. 2001).
Search Report for European App. No. EP 03006505, dated Sep. 29, 2003, 3 pgs.
XP000502465: "Power Management Method for Portable Personal Computer with Modem", vol. 38, No. 2, Feb. 1995.
www.wikipedia.com->CPLD.

* cited by examiner

AUTO DETECTION OF COPPER AND FIBER MODE

CROSS-REFERENCE TO RELATED APPLICATIONS

This patent application claims priority to U.S. provisional application No. 60/398,604, titled, "Auto Detection of Copper and Fiber Mode," filed Jul. 26, 2002, and to U.S. provisional application No. 60/365,806, titled, "Gigabit Ethernet Transceiver," filed Mar. 21, 2002, both of which are incorporated herein by reference in their entirety.

BACKGROUND OF THE INVENTION

1. Field of the Invention

The present invention is directed to Ethernet communication systems and, more particularly, to Ethernet physical layer devices ("PHYs").

2. Related Art

Ethernet is a widely used technology in local area networks ("LAN") and other computer networks. The Institute for Electrical and Electronics Engineers ("IEEE") has developed standards for Ethernet communication systems. See, for example, IEEE 802.3, incorporated herein by reference in its entirety. The IEEE 802.3 standards have been adopted by the International Organization for Standardization ("ISO"), making the IEEE 802.3 standards worldwide standards.

In an Ethernet network, a computer utilizes an Ethernet transceiver to transmit and receive signals between the computer and a network. The transceiver typically interfaces with the network via a physical link medium, such as copper or fiber.

An Ethernet transceiver typically includes a media access controller ("MAC") that interfaces with applications running on the computer. Alternatively, an Ethernet module can include a switch or an optical module. An Ethernet transceiver also includes a physical layer device, or "PHY" that interfaces between the MAC/switch and the physical link media. PHYs typically interface with physical link media using serialized data streams. PHYs typically interface with MACs/switches using packet-based interfaces.

Conventional PHYs are designed to interface with copper or fiber physical link media. Users may, however, have both fiber and copper links.

What is needed, therefore, is a PHY that can selectively interface with both copper and fiber physical links without user or software intervention. What is also needed, is a PHY that can detect active copper and fiber link partners.

BRIEF SUMMARY OF THE INVENTION

The present invention is directed to methods and systems for operating a physical layer device ("PHY") in an Ethernet network. More particularly, the present invention is directed to methods and systems for detecting active link partners and for selecting a mode of operation corresponding to detected active link partners, without user intervention.

In accordance with the invention, a PHY has copper and fiber ports for coupling to copper and fiber link mediums. An electrical/optical converter typically interfaces the fiber port with the fiber link media. The PHY further includes a fiber signal detect node for coupling to a fiber signal detect output port of the electrical/optical converter. The fiber signal detect node receives a fiber signal detect indication from the electrical/optical converter. The PHY is thus able to monitor the fiber link media for an active fiber link partner.

The PHY further includes copper link detect circuitry that allows the PHY to monitor a copper link media for an active copper link partner. The PHY is thus able to monitor/detect both the fiber link media and the copper link media for active link partners.

In accordance with the invention, the PHY selects a mode of operation corresponding to detected active link partners. For example, a copper mode of operation is selected when an active copper link partner is detected and an active fiber link partner is not detected. Similarly, a fiber mode of operation is selected when an active fiber link partner is detected and an active copper link partner is not detected.

The PHY then interfaces with the active copper or fiber link partner in the selected mode of operation. For example, the PHY interfaces with the active copper link partner when the copper mode of operation is selected. Similarly, the PHY interfaces with the active fiber link partner when the fiber mode of operation is selected.

The invention optionally provides a prioritized mode of operation for when active copper and fiber link partners are detected. The prioritized mode can be user-selectable or factory set. The invention optionally powers down circuitry associated with an unselected mode of operation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

DETAILED DESCRIPTION OF THE INVENTION

Table of Contents

I. Introduction

II. Detecting Active Copper and Fiber Link Partners

III. Selecting a Mode of Operation Without User Intervention

IV. Powering Down Unselected Media

V. Methods for Detecting Active Link Partners, for Selecting a Mode of Operation, and for Powering Down Unselected Media VI. Integration in a Multi-Mode PHY VII. Conclusion I. Introduction The present invention is directed to a PHY that interfaces with a link device, such as a MAC, a switch, an optical device, or the like ("MAC/switch"), through an interface. The PHY includes both copper mode and fiber mode capability. The PHY detects active copper and fiber link partners without user or software intervention and switches between copper and fiber modes of operation without user or software intervention.

Figure 1:
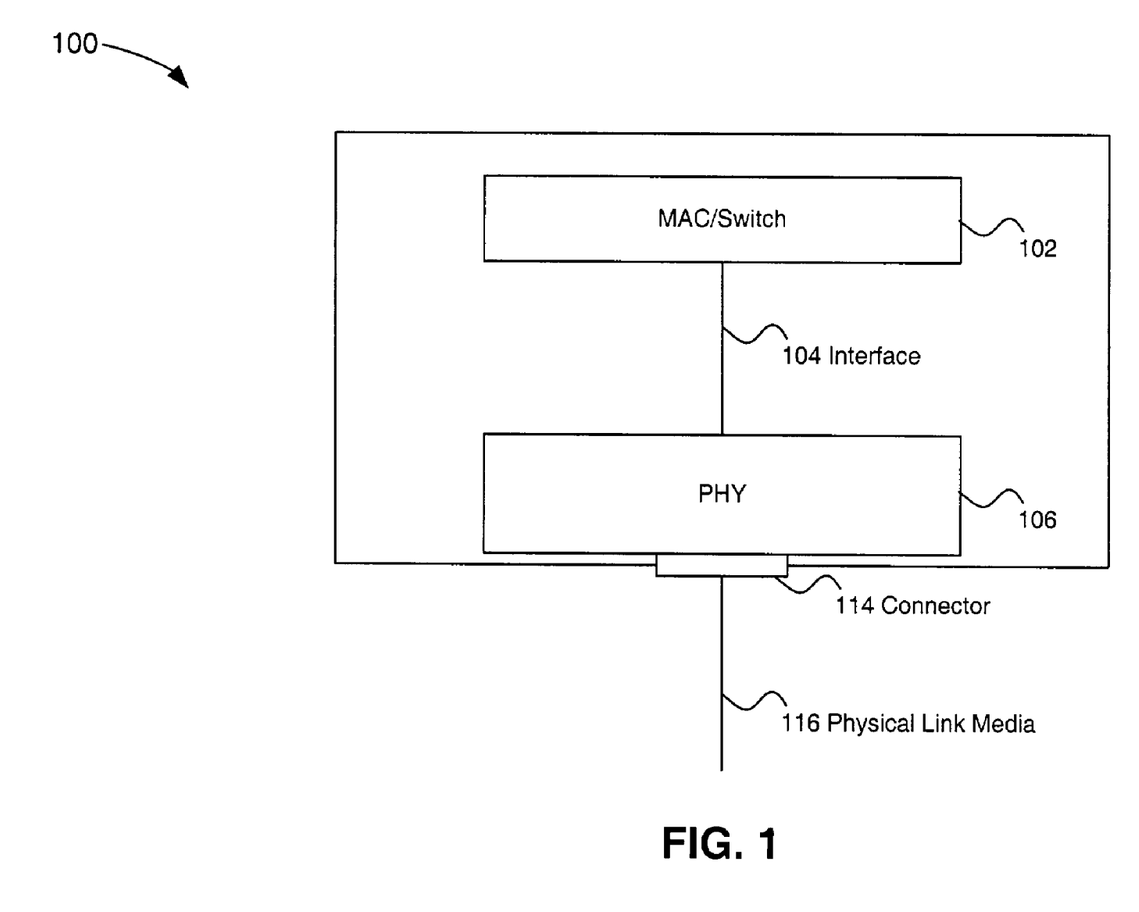
FIG. 1 is a high-level block diagram of an Ethernet transceiver 100.

FIG. 1 is a high-level block diagram of an Ethernet transceiver, or module 100, wherein a MAC/switch 102 interfaces with a PHY 106 through an interface 104. The PHY 106 is coupled to a physical link media 116 by a connector 114.

Figure 2:
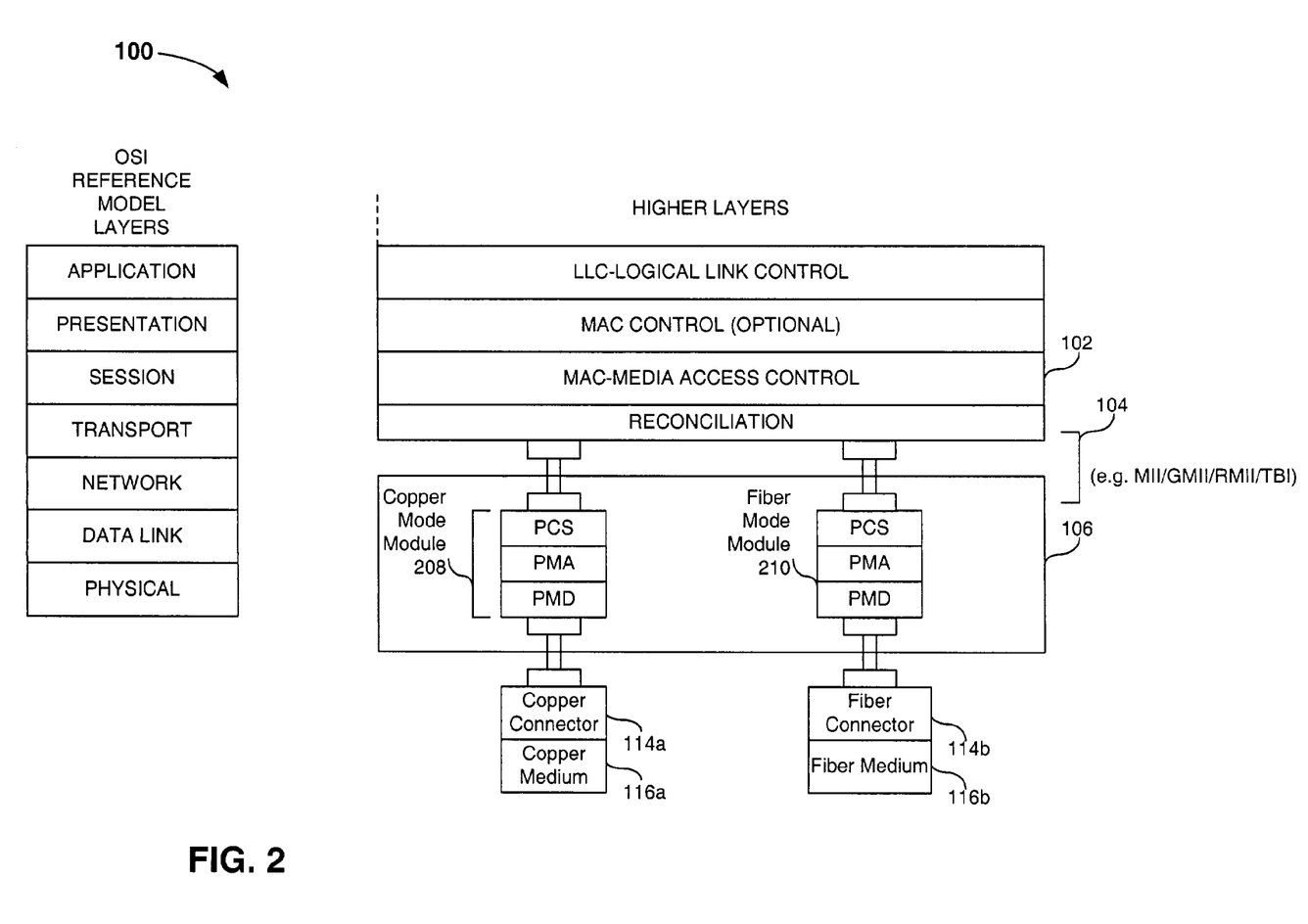
FIG. 2 is a detailed block diagram of an example embodiment of the Ethernet transceiver 100.

FIG. 2 is a detailed block diagram of an example embodiment of the Ethernet module 100.

In FIG. 2, the PHY 106 includes a copper mode module 208 and a fiber mode module 210. The copper mode module 208 and the fiber mode module 210 include physical coding sub-layers ("PCSs"), physical medium attachment sub-layers ("PMAs"), and physical medium dependent sub-layers ("PMDs"). Functions and operations of the PCSs, PMAs, and PMDs are well known to those skilled in the relevant art(s).

The copper mode module 208 implements signaling for a copper medium 116a in accordance with, for example, IEEE 802.3, clauses 28 and 40, and/or ANSI standards. The copper mode module 208 can include signal processing circuitry such as, for example, and without limitation, echo cancellation, cross-talk cancellation, equalization, timing and/or phase recovery, gain control, and baseline wander correction. Such signal processing can be used, for example, to improve signal-to-noise ratios ("SNR") and "eye" openings of signals sent to and/or received from the copper link media 116a. Circuitry and functionality that is utilized primarily for copper links is referred to herein as "copper mode" circuitry.

The fiber mode module 210 implements signaling for a fiber medium 116b in accordance with, for example, IEEE 802.3, clauses 36 and 37, and/or ANSI standards. The fiber mode module 210 can include signal processing circuitry for signals sent to and/or received from the fiber link media 116b. Circuitry and functionality that is utilized primarily for fiber links is referred to herein as "fiber mode" circuitry.

The interface 104 can include one or more of a variety of interfaces including, without limitation, a Media Independent Interface ("MII"), a Gigabit MII ("GMII"), RGMII and/or TBI. MII and GMII standards are defined in, for example, IEEE 802.3. GMII and MII support three speeds, 10/100/1000. GMII typically requires at least 22 pins, typically including 8 transmit and 8 receive data pins.

The Ethernet module 100 further includes a copper connector 114a, such as an RJ45 connector, that connects the PHY 106 to a copper link medium 116a. The Ethernet module 100 also includes a fiber connector 114b that connects the PHY 106 to a fiber link media 116b. The fiber connector 114b typically includes and optical-to-electrical converter.

The example Ethernet module 100 illustrated in FIGS. 1 and 2 are provided for illustrative purposes. The present invention is not limited to these examples. Based on the description herein, one skilled in the relevant art(s) will understand that the invention can be implemented in other types of Ethernet modules as well.

The PHY 106 can include one or more Media Independent Interface ("MII") registers, including MII registers that are reserved for standard defined uses, such as, for example, mode configuration, mode status, PHY identification number(s), auto-negotiation functions, link partner ability, and link status. MII registers can also include one or more user-definable registers. The MII registers can be written to, to select between copper mode and fiber mode of operation. This, however, requires a user to know whether there is an active link partner (e.g., another Ethernet transceiver), coupled to a copper and/or fiber link, and requires that the user know how to properly set the MII register(s).

In accordance with the invention, the PHY 106 detects whether there is an active link partner (e.g., another PHY) attached to the copper physical link media 116a and/or to the fiber physical link media 116b, without user or software intervention, as described below.

After active link partners are detected, the Ethernet module 100 can utilize the detection information for one or more of a variety of purposes, including, without limitation, selecting an appropriate mode of operation and/or for powering down circuitry associated with an unselected mode.

II. Detecting Active Copper and Fiber Link Partners

Figure 3:
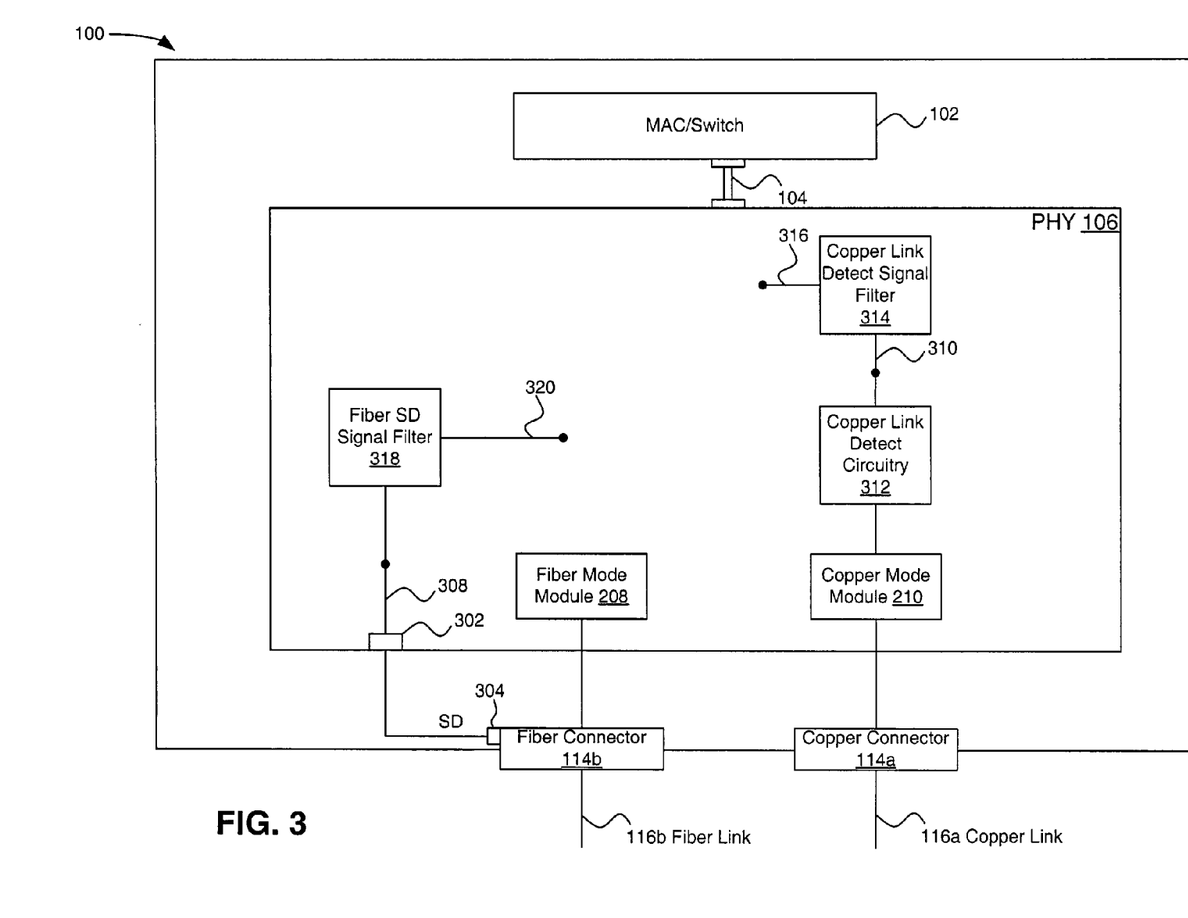
FIG. 3 is a block diagram of the Ethernet module 100, including copper link detect circuitry 312 and a fiber signal detect ("SD") node 302, in accordance with the invention.

Methods and systems for detecting active link partners are now described. FIG. 3 is a block diagram of the Ethernet module 100, wherein the PHY 106 include, among other things, copper link detect circuitry 312 and a fiber signal detect ("SD") node 302.

The fiber SD node 302 is now described. Recall from above that the fiber connector 114b typically includes an optical/electrical converter. Conventional optical-to-electrical converters include a fiber SD output port, illustrated here as fiber SD output port 304. The fiber SD output port 304 is active when an intensity of an optical signal on the fiber link media 116b is above a threshold. The fiber SD output port 304 is coupled to the fiber SD node 302. When the intensity of an optical signal on the fiber link media 116b is above the threshold, an active fiber SD signal 308 is provided from the fiber SD output port 304 to the fiber SD node 302. In this way, the PHY 106 detects active fiber link partners.

The copper link detect circuitry 312 is now described. The copper link detect circuitry 312 includes circuitry that detects whether a copper link partner is active on the copper physical link media 116a. In the example of FIG. 3, the copper link detect circuitry 312 is coupled to the copper mode module 210. Alternatively, the copper link detect circuitry 312 can be coupled to the copper connector 114a, to the copper link media 116a, and/or anywhere there between.

The copper link detect circuitry 312 detects whether a copper link partner is active on the copper physical link medium 116a. When an active link partner is detected by the copper link detect circuitry 312, the copper link detect circuitry 312 outputs a copper link detect signal 310. The copper link detect circuitry 312 can be implemented, for example, as disclosed in one or more of the following U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and Ser. No. 60/398,603, titled, "Auto Powerdown for Forced Speed Modes," filed Jul. 26, 2002.

All of which are incorporated herein by reference in their entireties. The invention is not, however, limited to the embodiments disclosed therein.

The PHY 106 illustrated in FIG. 3 thus detects whether there is an active link partner coupled to the fiber connector 114*b* and/or to the copper connector 114*a*, without user and/or software intervention. After active link partners are detected, the Ethernet module 100 can utilize the detection information for one or more of a variety of purposes, including, without limitation, selecting an appropriate mode of operation and/or powering down circuitry associated with an unselected mode, both of which are described below.

The PHY 106 optionally includes a copper link detect signal filter 314 and/or a fiber SD signal filter 318. The copper link detect signal filter 314 includes circuitry for filtering and/or debouncing the copper link detect signal 310. The copper link detect signal filter 314 outputs a filtered copper link detect signal 316. The fiber SD signal filter 318 includes circuitry for filtering and/or debouncing the fiber SD signal 308. The fiber SD signal filter 318 outputs a filtered fiber SD signal 320.

III. Selecting a Mode of Operation Without User Intervention

Figure 4:
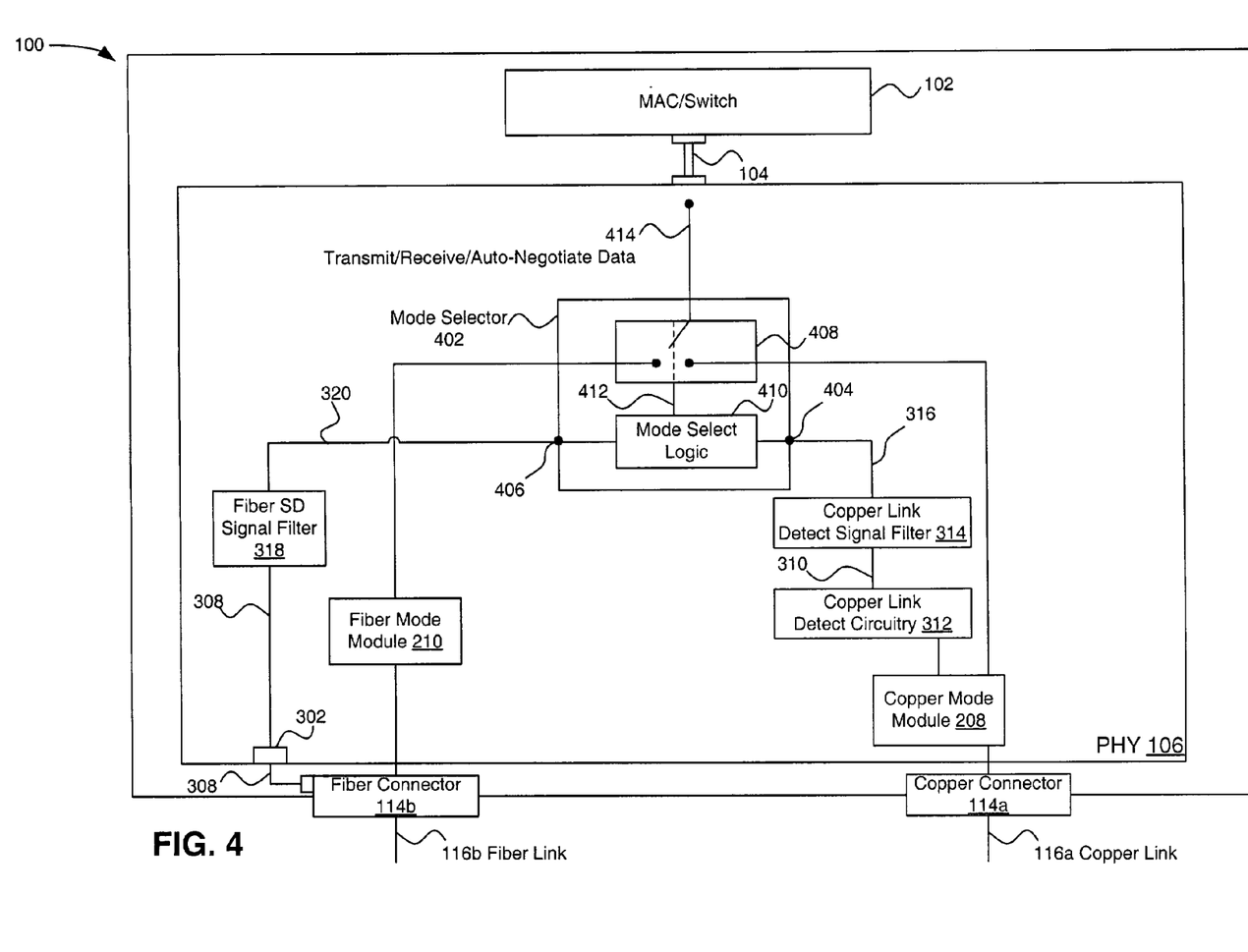
FIG. 4 is a block diagram of the Ethernet module 100, further including a mode selector 402, which includes a copper link detect node 404 and a fiber signal detect ("SD") node 406.

The detection of one or more active link partners can be used to select a mode of operation without user intervention. FIG. 4 is a block diagram of the Ethernet module 100, further including a mode selector 402, which includes a copper link detect node 404 and a fiber signal detect ("SD") node 406. The copper link detect node 404 is coupled to the copper link detect signal filter 314 to receive the filtered copper link detect signal 316. When an active copper link partner is detected by the copper link detect circuitry 312, the copper link detect signal filter 314 outputs the filtered copper link detect signal 316 to the copper link detect node 404.

The fiber SD node 406 is coupled to the fiber SD signal filter 318. When an intensity of an optical signal on the fiber link media 116*b* is above the threshold, the filtered active fiber SD signal 320 is provided to the mode selector 402 through the fiber SD node 406.

The mode selector 402 is functionally illustrated with a switch module 408 controlled by mode selector logic 410. The mode selector logic 410 outputs a mode select signal 412 to the switch module 408. The mode select signal 412 controls the switch module 408 to select a copper or fiber mode of operation, depending on the state(s) of the fiber SD signal 308 and the copper link detect signal 310. The mode selector 402 routes data 414 through either the copper mode module 208 and/or the fiber mode module 210. The data 414 includes transmit and receive data. The data 414 optionally includes auto-negotiation data. When the data 414 is routed through the copper mode module 208, the PHY 106 is said to operate in the copper mode. When the data 414 is routed through the fiber mode module 210, the PHY 106 is said to operate in the fiber mode. The functional illustration of FIG. 4 is provided for exemplary purposes. The invention is not, however, limited to the functional illustration of FIG. 4.

The mode selector logic 410 includes logic and/or embedded software that processes the filtered fiber SD signal 320 and the filtered copper link detect signal 316. Table 1 below is an example truth table illustrating logic and/or embedded software implemented by mode the selector logic 410 and/or the mode selector 402.

TABLE 1

| Fiber SD Signal 308/320 | Copper Link Detect Signal 310/316 | Mode Selected by the Mode Selector 402 |
| --- | --- | --- |
| 0 | 0 | Configurable |
| 0 | 1 | Copper Mode |
| 1 | 0 | Fiber Mode |
| 1 | 1 | Configurable |

When the filtered copper link detect signal 316 is active and the filtered fiber SD signal 320 is inactive, copper mode is selected. Similarly, when the filtered copper link detect signal 316 is inactive and the filtered fiber SD signal 320 is active, fiber mode is selected. When copper mode is selected, the PHY 106 interfaces with the copper link 116*a* through the copper mode module 208. When fiber mode is selected, the PHY 106 interfaces with the fiber link 116*b* through the fiber mode module 210.

The mode selector 402 optionally provides configurable states as well. A first optional configurable state applies when no active link is detected on either the copper link 116*a* or the fiber link 116*b*. A second optional configurable state applies when active links are detected on both the copper link 116*a* and the fiber link 116*b*. The mode selector 402 is optionally configurable for either or both of these situations. In other words, the mode selector 402 can be configured to default to copper mode or fiber mode in one or both of the situations. Alternatively, the mode selector 402 can be configured to default to copper mode for one of the two situations, and to fiber mode for the other situation. This configurability essentially allows prioritization of copper mode or fiber mode. The priorities can be configurable through logic settings and/or software.

IV. Powering Down Unselected Media

Figure 5:
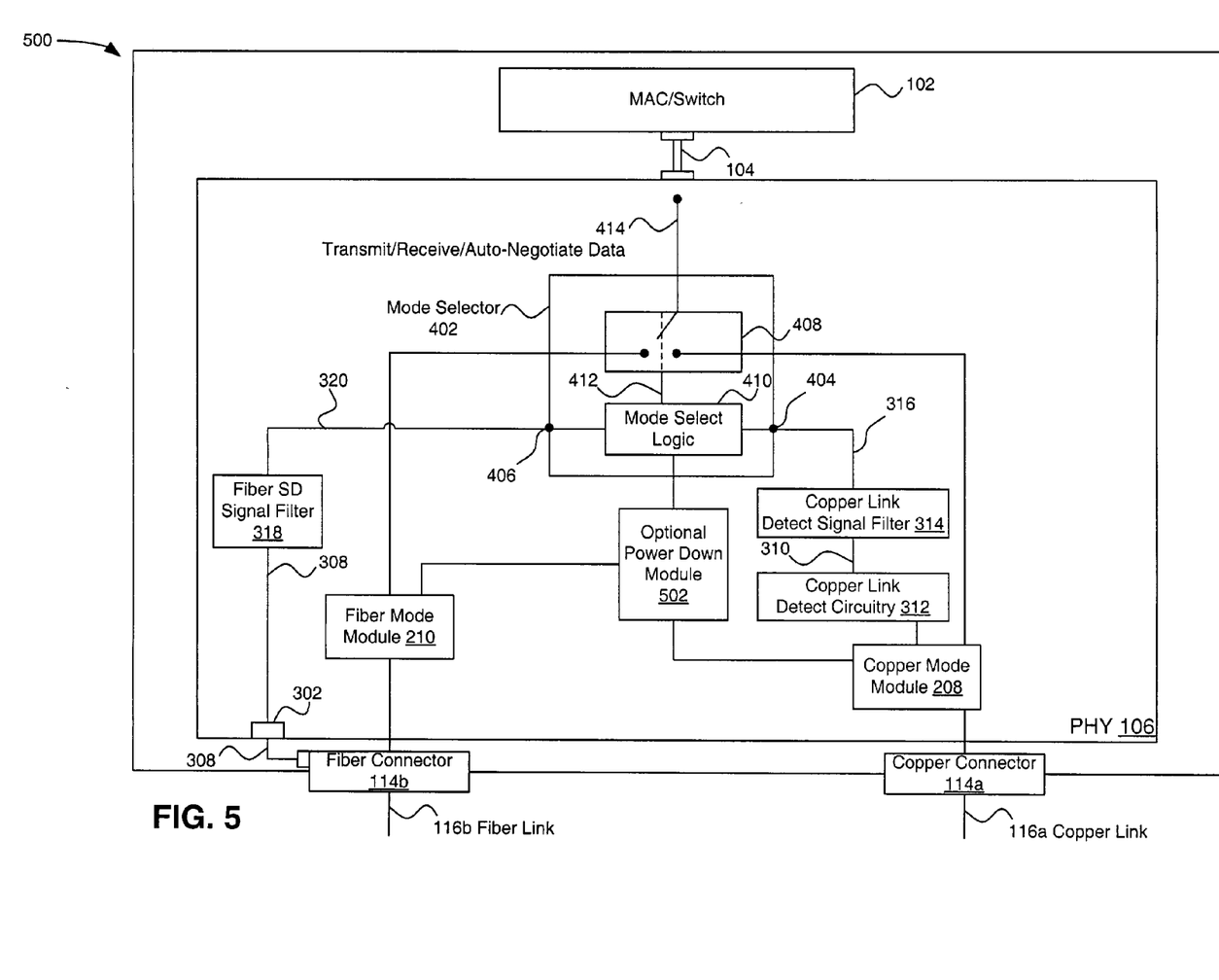
FIG. 5 is a block diagram of the Ethernet module 100 including a power-down module 502.

The detection of one or more active link partners can be used to power down, in whole or in part, circuitry associated with an unselected mode of operation. FIG. 5 is a block diagram of the Ethernet module 100 including an optional power-down module 502.

When the fiber mode is selected, the power-down module 502 powers down the copper mode PMD 118, in whole or in part. When copper mode is selected, the power-down module 502 powers down the fiber mode PMD 120, in whole or in part.

In the example of FIG. 5, the power-down module 502 is controlled by the mode selector 402. Alternatively, the power-down module 502 receives the copper link detect signal 310, the fiber SD signal 308, the filtered copper link detect signal 316, and/or the filtered fiber SD signal 320, directly, and determines whether to power-down the copper mode PMD 118 or the fiber mode PMD 120, in whole or in part.

The default priorities discussed above can be employed by the power down module 502. For example, when priority is set to fiber mode, and when both the copper link 116*a* and the fiber link 116*b* are active, the copper mode PMD 118 is powered down, in whole or in part. This would prevent a copper link partner attached to the copper link 116*a* from attempting to link up since no energy is transmitted into the copper link 116*a* by the copper mode PMD 118.

The default priorities discussed above can be further used to prevent the prioritized mode circuitry from being completely powered down. In other words, if the prioritized media is currently inactive, then the circuitry associated with the prioritized media would not be powered down. This allows the PHY 106 to detect a subsequently active link partner and switch to the prioritized mode.

For example, when priority is set to fiber mode, and only the copper link 116*a* is active, copper mode is selected, but the fiber mode PMD 120 is not powered down, or at least not completely powered down. This allows the PHY 106 to detect a subsequently active fiber link partner and switch to fiber mode. In this case, the copper mode PMD 118 can then be powered down.

The optional power-down module 502 can be implemented as disclosed in one or more of the following U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and Ser. No. 60/398,603, titled, "Auto Powerdown for Forced Speed Modes," filed Jul. 26, 2002.

All of which are incorporated herein by reference in their entireties. The invention is not, however, limited to the embodiments disclosed therein.

Figure 6:
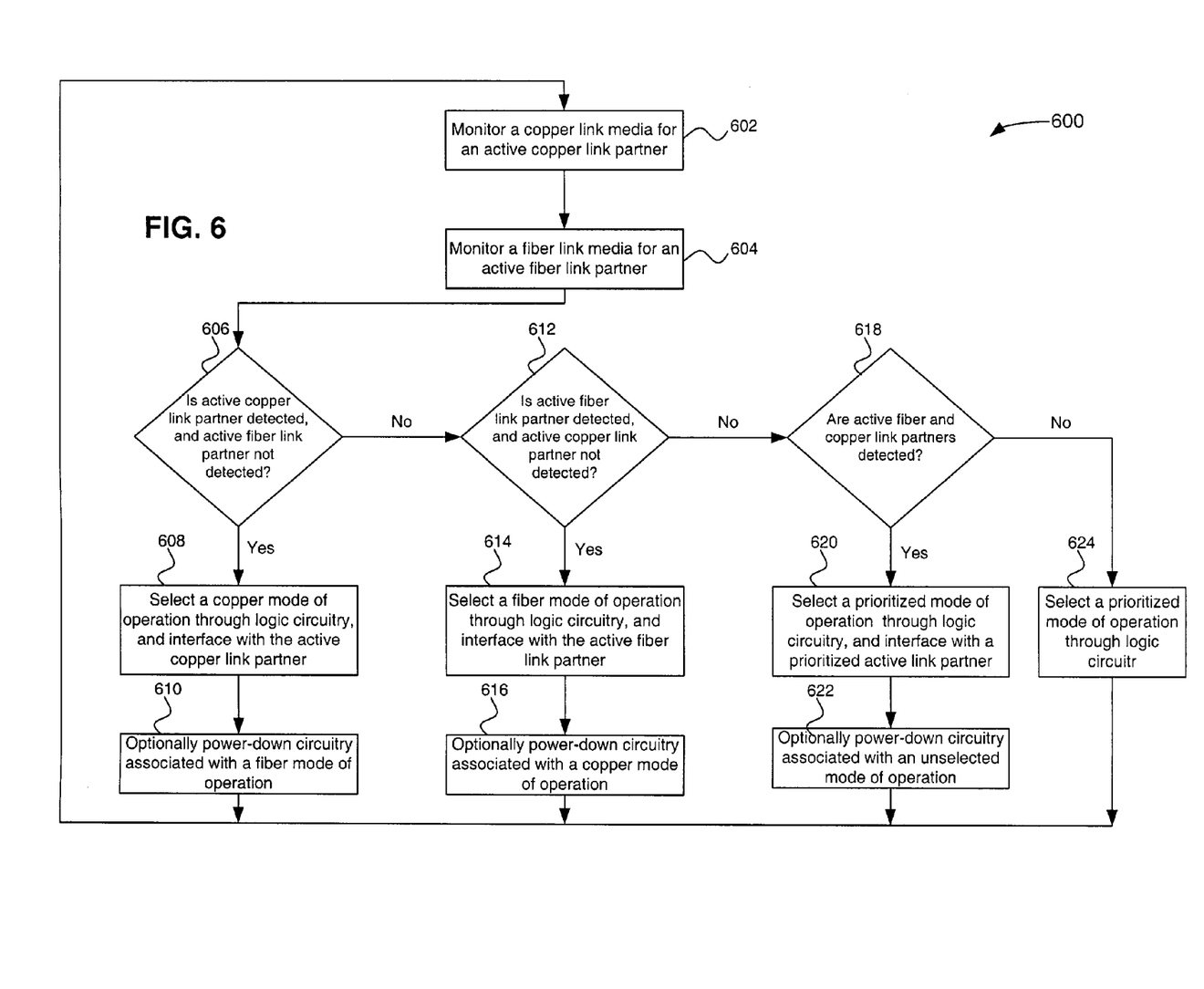
FIG. 6 is a process flowchart 600 for detecting active link partners, for selecting an appropriate mode of operation, and for powering down unselected media, in accordance with the invention.

V. Methods for Detecting Active Link Partners, for Selecting a Mode of Operation, and for Powering Down Unselected Media FIG. 6 is a process flowchart 600 for operating a physical layer device ("PHY") in an Ethernet network. More particularly, the process flowchart 600 illustrates a method for detecting active link partners, for selecting an appropriate mode of operation, and for optionally powering down unselected media, in accordance with the invention. The process flowchart 600 is described with reference to one or more of the example block diagrams in FIGS. 1-5. The process flowchart 600 is not, however, limited to the example block diagrams FIGS. 1-5. Based on the description herein, one skilled in the relevant art(s) will understand that the process flowchart 600 can be implemented with other Ethernet module implementations as well.

The process begins at step 602, which includes monitoring a copper link media for an active copper link partner. Step 604 includes monitoring a fiber link media for an active fiber link partner.

In step 606, if an active copper link partner is detected and an active fiber link partner is not detected, processing proceeds to step 608. In step 608, a copper mode of operation is selected for the PHY, preferably through logic circuitry, and the PHY interfaces with the active copper link partner in the copper mode of operation.

Processing optionally proceeds to step 610, which includes powering down circuitry associated with a fiber mode of operation. The powering down operation can be a partial or complete powering down operation. Processing then returns to step 602, which can be repeated when the PHY detects a link partner change.

Referring back to step 606, and following the path to step 612, if an active fiber link partner is detected and an active copper link partner is not detected, processing proceeds to step 614. In step 614, a fiber mode of operation is selected for the PHY, preferably through logic circuitry, and the PHY interfaces with the active fiber link partner in the fiber mode of operation.

Processing optionally proceeds to step 616, which includes powering down circuitry associated with the copper mode of operation. The powering down operation can be a partial or complete powering down operation. Processing then returns to step 602, as described above.

Referring back to step 612, and following the path to step 618, if active fiber and copper link partners are detected, processing proceeds to step 620. In step 614, a prioritized mode of operation is selected for the PHY, preferably through logic circuitry, and the PHY interfaces with the associated active link partner in the prioritized mode of operation. For example, when the copper mode of operation is prioritized, the copper mode of operation is selected, and the PHY interfaces with the active copper link partner in the copper mode of operation. Alternatively, when the fiber mode of operation is prioritized, the fiber mode of operation is selected, and the PHY interfaces with the active fiber link partner in the fiber mode of operation. Preferably, a mode of operation can be prioritized by a user through hardware, software, firmware, and/or combinations thereof. Alternatively, priority is factory-set.

Processing optionally proceeds to step 622, which includes powering down circuitry associated with an unselected mode of operation. The powering down operation can be a partial or complete powering down operation. Processing then returns to step 602, as described above.

Referring back to step 618, if no active fiber link partners and no active copper link partners are detected, processing proceeds to step 624. In step 624, a prioritized mode of operation is selected for the PHY, preferably through logic circuitry, and the PHY interfaces with the associated active link partner in the prioritized mode of operation. For example, when the copper mode of operation is prioritized, the copper mode of operation is selected, and the PHY interfaces with the active copper link partner in the copper mode of operation. Alternatively, when the fiber mode of operation is prioritized, the fiber mode of operation is selected, and the PHY interfaces with the active fiber link partner in the fiber mode of operation. Preferably, a mode of operation can be prioritized by a user through hardware, software, firmware, and/or combinations thereof. Alternatively, priority is factory-set. Processing then returns to step 602, as described above.

VI. Integration in a Multi-Mode PHY

Figure 7:
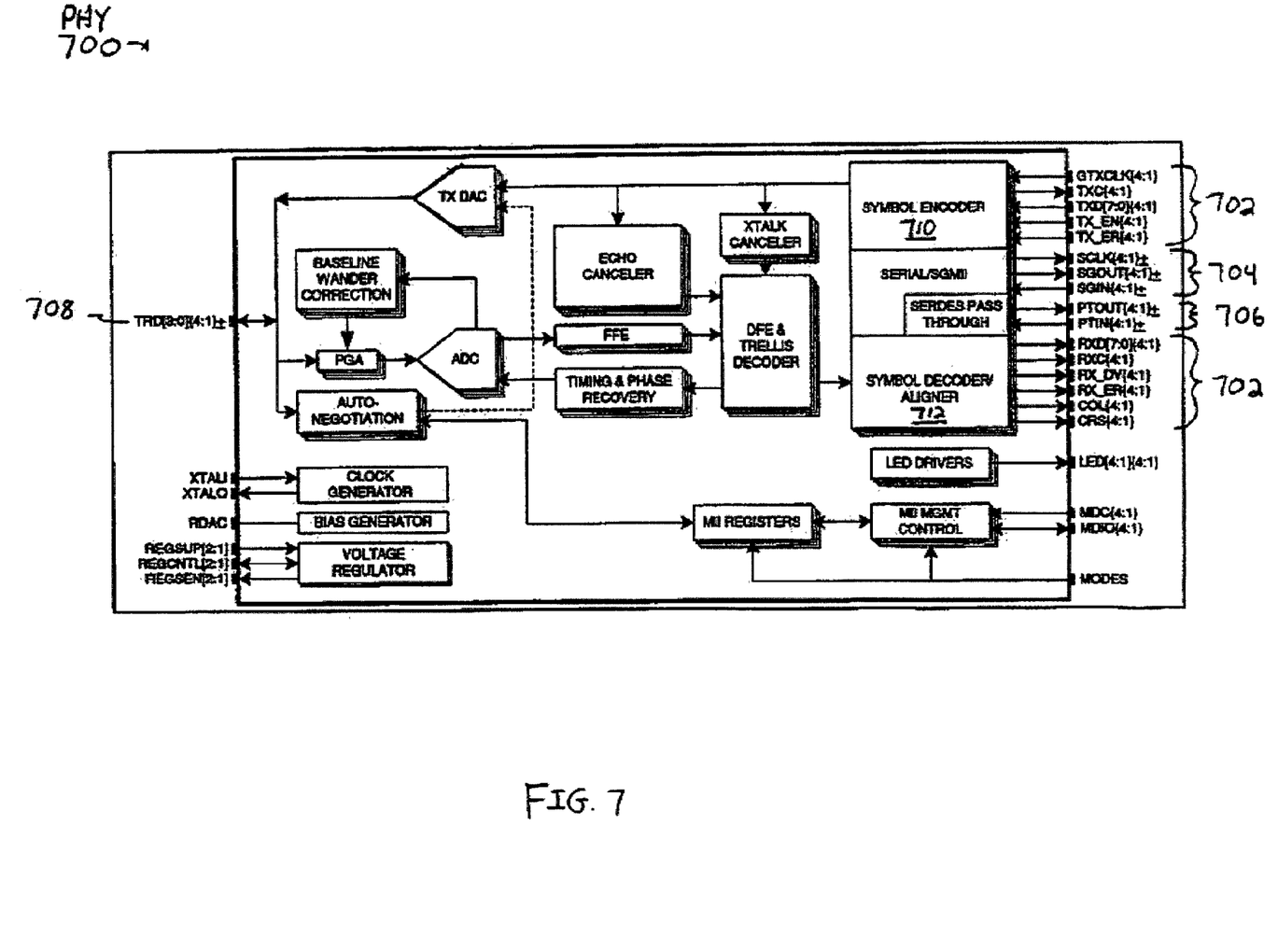
FIG. 7 is a block diagram of a multi-mode physical layer device integrated circuit 700 in which the present invention can be implemented.

The present invention can be implemented within a multi-mode PHY integrated circuit ("IC") that is designed to interface with MACs, switches, and/or optical devices through one or more of SGMII, GBIC, and/or other interfacing formats. For example, FIG. 7 is a block diagram of a multi-mode PHY IC 700 in which the present invention can be implemented. The PHY IC 700 includes parallel data ports 702 that can be coupled to a MI/GMII MAC/switch. The parallel data ports 702 can serve as the GMII/MII 104 (FIGS. 1B-5), for example. The PHY IC 700 also includes a copper port 708, which can serve as the output of the copper mode PMD 118 (FIGS. 1B, 3, 4, and 5).

The PHY IC 700 also includes serial/SGMII ports 704 that can used as input ports or output ports. For example, as output ports, the serial/SGMII ports 704 can be coupled to a fiber physical link media. In this situation, the serial/SGMII ports 704 can serve as the output of the fiber mode module 210, illustrated in FIGS. 1B, 3, 4, and 5. The mode selector 402 illustrated in FIGS. 4 and 5 can be implemented within a symbol encoder 710 and/or a symbol decoder/aligner 712, illustrated in FIG. 7. As input ports, the serial/SGMII ports 704 can be coupled to an SGMII MAC/switch, a GBIC MAC/switch, a 1000-X MAC/switch, or any other type of serial MAC/switch.

The PHY IC 700 also includes copper mode circuitry for processing signals routed through the copper port 708. In the example of FIG. 7, the copper mode circuitry includes echo cancellation circuitry, cross-talk cancellation circuitry, equalization circuitry, timing and phase recovery circuitry, gain control circuitry, and baseline wander correction circuitry. The copper mode circuitry illustrated in FIG. 7 is an example embodiment of the copper mode module 208.

VII. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting active link partners and for selecting a mode of operation based on detected active link partners, in an Ethernet physical layer device, without user intervention, comprising:
   (1) monitoring an energy level at a copper link media port for an active copper link partner;
   (2) monitoring an energy level at a fiber link media port for an active fiber link partner;
   (3) selecting a copper mode of operation when said active copper link partner is detected and said active fiber link partner is not detected;
   (4) selecting a fiber mode of operation when said active fiber link partner is detected and said active copper link partner is not detected;
   (5) interfacing with said active copper link partner when said copper mode of operation is selected; and
   (6) interfacing with said active fiber link partner when said fiber mode of operation is selected.

2. The method according to claim 1, further comprising: powering down circuitry associated with an unselected mode of operation.

3. The method according to claim 1, further comprising: selecting, through said logic circuitry, said fiber mode of operation when said active fiber link partner and said active copper link partner are detected.

4. The method according to claim 3, further comprising: powering down circuitry associated with said copper mode of operation.

5. The method according to claim 1, further comprising: selecting, through said logic circuitry, said copper mode of operation when said active copper link partner and said active fiber link partner are detected.

6. The method according to claim 5, further comprising: powering down circuitry associated with said fiber mode of operation.

7. The method according to claim 1, wherein said logic circuitry includes a user-controllable priority setting that controls said logic circuitry to select one of said copper mode of operation or said fiber mode of operation when said active copper link partner and said active fiber link partner are detected.

8. The method according to claim 7, further comprising: powering down circuitry associated with an unselected mode of operation.

9. The method according to claim 7, wherein said user-controllable priority setting is implemented with a logic circuit.

10. The method according to claim 7, wherein said user-controllable priority setting is implemented with a register.

11. The method according to claim 7, wherein said user-controllable priority setting is implemented with software.

12. The method according to claim 1, further comprising interfacing with a media access controller through a serial interface.

13. The method according to claim 1, further comprising interfacing with a media access controller through a media independent interface.

14. The method according to claim 1, further comprising interfacing with a media access controller through a gigabit media independent interface.

15. The method according to claim 1, wherein step (1) comprises receiving
    a signal from copper link detect circuitry.

16. The method according to claim 15, wherein step (1) further comprises
    filtering said signal from said copper link detect circuitry.

17. The method according to claim 16, wherein step (1) further comprises
    debouncing said signal from said copper link detect circuitry.

18. The method according to claim 1, wherein step (2) comprises receiving
    a fiber signal detect signal from an optical/electrical converter.

19. The method according to claim 18, wherein step (2) further comprises
    filtering said fiber signal detect signal.

20. The method according to claim 19, wherein step (1) further comprises
    debouncing said fiber signal detect signal.

21. A physical layer device for an Ethernet communication system configured to detect active link partners and to switch between modes of operation based on detected active link partners, without user intervention, comprising:
    a mode selector including mode select logic;
    a packet-based interface port coupled to said mode selector;
    a fiber link media port coupled to said mode selector;
    a fiber signal detect port coupled to said mode selector;
    a copper link media port coupled to said mode selector;
    copper link detect circuitry coupled to said copper link media port and coupled to said mode selector, said copper link detect circuitry configured to monitor an energy level at a copper link media port to detect an active copper link partner coupled to said copper link media port;
    a fiber mode module coupled between said mode selector and said fiber link media port, said fiber mode module configured to monitor an energy level at a fiber link media port to interface with said active fiber link partner; and
    a copper mode module coupled between said mode selector and said copper link media port, said copper mode module configured to interface with said active copper link partner,
    wherein said mode selector monitors said fiber signal detect port for an active fiber link partner;
    wherein said mode selector monitors an output of said copper link detect circuitry for an active copper link partner;
    wherein said mode select logic controls said mode selector to couple said packet-based interface port with said fiber mode module when said active fiber link partner is detected and said active copper link partner is not detected;

wherein said mode select logic controls said mode selector to couple said packet-based interface port with said copper mode module when said active copper link partner is detected and said active fiber link partner is not detected.

22. The apparatus according to claim 21, wherein said packet-based interface port comprises a gigabit media independent interface port.

23. The apparatus according to claim 21, wherein said mode select logic comprises a user-controllable priority setting that controls said mode selector to couple said packet-based interface port to one of said fiber mode module or said copper mode module when said active copper link partner and said active fiber link partner are detected.

24. The apparatus according to claim 21, wherein said mode select logic controls said mode selector to couple said packet-based interface port with said fiber mode module when said active copper link partner and said active fiber link partner are detected.

25. The apparatus according to claim 21, wherein said mode select logic controls said mode selector to couple said packet-based interface port with said copper mode module when said active copper link partner and said active fiber link partner are detected.

26. The apparatus according to claim 21, further comprising a power down module coupled to said mode selector, said fiber mode module, and said copper mode module.

27. The apparatus according to claim 26, wherein:
said power down module is configured to power down circuitry associated with said fiber mode module when said packet-based interface port is coupled to said copper mode module; and
said power down module is configured to power down circuitry associated with said copper mode module when said packet-based interface port is coupled to said fiber mode module.

28. The apparatus according to claim 23, further comprising a power down module coupled to said mode selector, said fiber mode module, and said copper mode module, wherein:
said power down module is configured to power down circuitry associated with said fiber mode module when said packet-based interface port is coupled to said copper mode module; and
said power down module is configured to power down circuitry associated with said copper mode module when said packet-based interface port is coupled to said fiber mode module.

29. The apparatus according to claim 24, further comprising a power down module coupled to said mode selector and said copper mode module, wherein said power down module is configured to power down circuitry associated with said copper mode module when said packet-based interface port is coupled to said fiber mode module.

30. The apparatus according to claim 25, further comprising a power down module coupled to said mode selector and said fiber mode module, wherein said power down module is configured to power down circuitry associated with said fiber mode module when said packet-based interface port is coupled to said copper mode module.

31. The apparatus according to claim 21, further comprising a copper link detect signal filter coupled between said copper link detect circuitry and said mode selector.

32. The apparatus according to claim 31, wherein said copper link detect signal filter is configured to filter the output signal from said copper link detect circuitry.

33. The apparatus according to claim 31, wherein said copper link detect signal filter is configured to debounce the output signal from said copper link detect circuitry.

34. The apparatus according to claim 21, further comprising a fiber signal detect signal filter coupled between said fiber signal detect port and said mode selector.

35. The apparatus according to claim 34, wherein said fiber signal detect signal filter is configured to filter a fiber signal detect signal received from said fiber signal detect port.

36. The apparatus according to claim 35, wherein said fiber signal detect signal filter is configured to debounce a fiber signal detect signal received from said fiber signal detect port.

37. A physical layer device for an Ethernet communication system, configured to detect active link partners and to select a mode of operation based on detected active link partners without user intervention, comprising:
means for monitoring an energy level at a copper link media port for an active copper link partner;
means for monitoring an energy level at a fiber link media port for an active fiber link partner;
means for selecting, through logic circuitry, a copper mode of operation when said active copper link partner is detected and said active fiber link partner is not detected;
means for selecting, through said logic circuitry, a fiber mode of operation when said active fiber link partner is detected and said active copper link partner is not detected;
means for interfacing with said active copper link partner when said copper mode of operation is selected; and
means for interfacing with said active fiber link partner when said fiber mode of operation is selected.

38. The method according to claim 1, wherein said logic circuitry includes a user-controllable priority setting that controls said logic circuitry to select one of said copper mode of operation or said fiber mode of operation when no active copper link partner and no active fiber link partner are detected.

39. The method according to claim 1, further comprising interfacing with a media access controller through a RGMII interface.

40. The method according to claim 1, further comprising interfacing with a media access controller through a TBI interface.

* * * * *